(12) United States Patent
Yang et al.

(10) Patent No.: US 10,166,531 B2
(45) Date of Patent: Jan. 1, 2019

(54) CATALYST FOR SELECTIVELY CATALYTICALLY OXIDIZING HYDROGEN SULFIDE, CATALYST FOR BURNING TAIL-GAS, AND PROCESS FOR DEEPLY CATALYTICALLY OXIDIZING HYDROGEN SULFIDE TO ELEMENT SULFUR

(71) Applicant: Nan Yang, Zibo, Shandong (CN)

(72) Inventors: Nan Yang, Shandong (CN); Yanwei Yang, Shandong (CN); Xianxian Zhang, Shandong (CN); Rui An, Shandong (CN); Chunhui Hao, Shandong (CN); Yingkui Zhang, Shandong (CN); Shu Sun, Shandong (CN); Hui Liu, Shandong (CN); Jialin Liu, Shandong (CN); Xiuqing Xie, Shandong (CN); Aimei Wang, Shandong (CN); Yin Zhu, Shandong (CN)

(73) Assignee: Nan Yang, Zibo, Shandong (CN)

( * ) Notice: Subject to any disclaimer, the term of this patent is extended or adjusted under 35 U.S.C. 154(b) by 0 days.

(21) Appl. No.: 15/525,052

(22) PCT Filed: Nov. 4, 2015

(86) PCT No.: PCT/CN2015/093756
§ 371 (c)(1),
(2) Date: May 5, 2017

(87) PCT Pub. No.: WO2016/070805
PCT Pub. Date: May 12, 2016

(65) Prior Publication Data
US 2017/0333880 A1    Nov. 23, 2017

(30) Foreign Application Priority Data
Nov. 5, 2014 (CN) .......................... 2014 1 06178633

(51) Int. Cl.
| C01B 17/04 | (2006.01) |
| B01D 53/86 | (2006.01) |
| B01J 21/06 | (2006.01) |
| B01J 23/745 | (2006.01) |
| B01J 23/847 | (2006.01) |
| B01J 35/00 | (2006.01) |
| B01J 8/04 | (2006.01) |
| C10K 1/00 | (2006.01) |
| C10K 1/34 | (2006.01) |

(52) U.S. Cl.
CPC ...... *B01J 23/8472* (2013.01); *B01D 53/8612* (2013.01); *B01J 8/0457* (2013.01); *B01J 21/063* (2013.01); *B01J 23/745* (2013.01); *B01J 35/0006* (2013.01); *C01B 17/0456* (2013.01); *C01B 17/0465* (2013.01); *C10K 1/004* (2013.01); *C10K 1/34* (2013.01); *B01D 2255/20707* (2013.01); *B01D 2255/20723* (2013.01); *B01D 2255/20738* (2013.01); *B01D 2257/304* (2013.01); *B01J 2208/00106* (2013.01); *B01J 2208/00176* (2013.01)

(58) Field of Classification Search
CPC .... B01J 23/8472; B01J 23/745; B01J 21/063; B01J 35/0006; B01D 53/8612; B01D 2255/20723; B01D 2255/20707; B01D 2255/20738; B01D 53/52; C01B 17/0465; C01B 17/04; C01B 17/0456; C01B 17/046
See application file for complete search history.

(56) References Cited

U.S. PATENT DOCUMENTS

| 7,833,935 B2 * | 11/2010 | Menini | B01J 21/063 502/338 |
| 9,776,133 B2 * | 10/2017 | Schoubye | B01D 53/8612 |
| 2002/0121227 A1 * | 9/2002 | Hartmann | A61K 8/19 106/439 |
| 2003/0037705 A1 * | 2/2003 | Hartmann | A61K 8/19 106/439 |
| 2003/0194366 A1 * | 10/2003 | Srinivas | B01D 53/8612 423/230 |
| 2009/0318285 A1 * | 12/2009 | Menini | B01J 21/063 502/338 |
| 2014/0155256 A1 * | 6/2014 | Becker | B01J 23/888 502/227 |

FOREIGN PATENT DOCUMENTS

CN       102039137 A  *  5/2011  ............ B01J 23/847

* cited by examiner

Primary Examiner — Timothy C Vanoy

(57) ABSTRACT

A catalyst for selectively oxidizing hydrogen sulfide to element sulfur, catalyst for burning tail-gas, and process for deeply catalytically oxidizing hydrogen sulfide to sulfur are disclosed. The catalyst for selectively oxidizing hydrogen sulfide to element sulfur is prepared by: 10-34% of iron trioxide and 60-84% of anatase titanium dioxide, and the balance being are auxiliary agents. Also a catalyst for burning tail-gas is prepared by: 48-78% of iron trioxide and 18-48% of anatase titanium dioxide, and the balance being auxiliary agents. The catalyst of the present invention has high selectivity and high sulfur recovery rate. An isothermal reactor and an adiabatic reactor of the present invention are connected in series and are filled with the above two catalysts for reactions, thus reducing total sulfur in the vented gas while having a high sulfur yield and conversion rate.

15 Claims, 1 Drawing Sheet

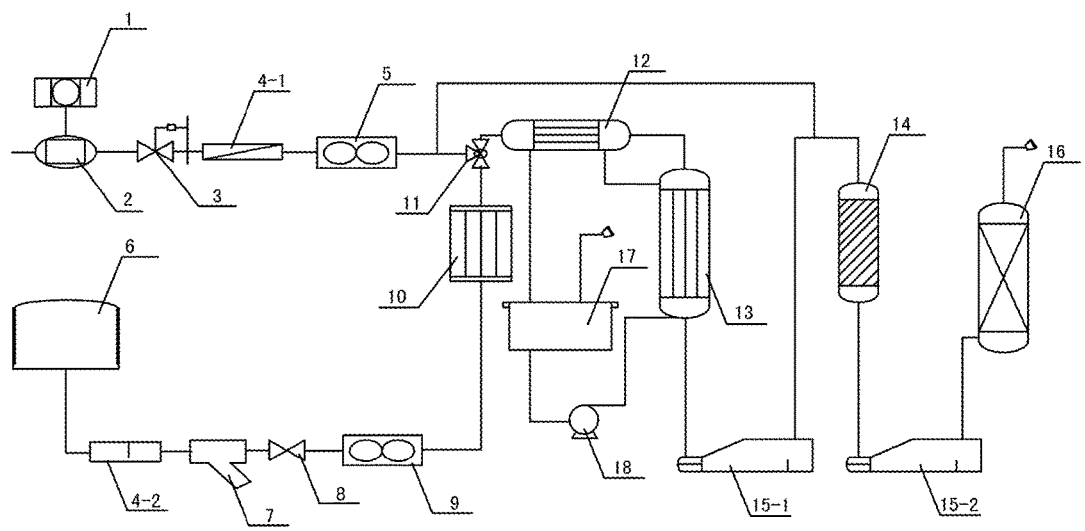

CATALYST FOR SELECTIVELY CATALYTICALLY OXIDIZING HYDROGEN SULFIDE, CATALYST FOR BURNING TAIL-GAS, AND PROCESS FOR DEEPLY CATALYTICALLY OXIDIZING HYDROGEN SULFIDE TO ELEMENT SULFUR

CROSS REFERENCE OF RELATED APPLICATION

This is a U.S. National Stage under 35 U.S.C 371 of the International Application PCT/CN2015/093756, filed Nov. 4, 2015, which claims priority under 35 U.S.C. 119(a-d) to CN 2014106178633, filed Nov. 5, 2014.

BACKGROUND OF THE PRESENT INVENTION

Field of Invention

The present invention relates to a catalyst for selectively catalytically oxidizing hydrogen sulfide, catalyst for burning tail-gas and process for deeply catalytically oxidizing hydrogen sulfide to element sulfur, belonging to catalyst application field.

Description of Related Arts

The Claus process ($H_2S \geq 30\%$) and direct oxidation method ($H_2S \leq 20\%$) are adopted for recovery of sulfur from acid gas according to different $H_2S$ concentration. modified Claus process adopts acid gas burner (1200-1300° C.)—two steps or three steps Claus catalytic conversion (200-300° C.)—Claus tail-gas treatment unit (reduction and absorption method)—tail-gas burner (750-1300° C.). The advantages of the modified Claus process are developed techniques, strong dealing capability and a sulfur recovery rate of 95-97%. The investment and operating cost of the tail-gas dealing unit is high. The overall investment on a sulfur recovery unit with a dealing capability of 50000 tons of sulfur/year is over RMB140 million of which the tail-gas treatment unit accounts for RMB 80 million. The flue gas consumption of the tail-gas burner is over RMB120 million/year. The cost of the sulfur is RMB 1500/ton while the market price of the sulfur is RMB600-1000/ton. When the $H_2S$ content is low ($\leq 20\%$) the direct oxidation method is adopted. The detailed procedures are as below: adopt CLINSULF-DO produced by © The Linde Group; blend and preheat the acid gas and the oxygen-containing gas—inner-cooling pipe reactor (top adiabatic section and the bottom isothermal section)—condensate separation—tail-gas burner; use CRS-31 catalyst Prandtl French company. The features of the CLINSULF-DO are short process, easy operation, long-life catalyst, sulfur recovery rate $\leq 90\%$, low selectivity and the tail-gas may also contains $H_2S$ and $SO_2$. The CLINSULF-DO is not transferred any long. Selextox process adopts four steps reactor and the detailed method is as below: preheat the oxygen-containing acid gas mixture—catalytic oxidation step—two steps Claus process—catalytic burning step—chimney emission; adopt selection catalyst. The overall sulfur recovery rate is $\leq 90\%$. When the acid gas $H_2S$ is $\geq 5\%$, cyclic process is needed, that is the tail-gas cycle return to the oxidation step. Super/Euro-claus from the ©Hofung Technology is a Claus tail-gas treatment method which supports the regular Claus sulfur recovery process; the detailed process is as below: tail-gas from the two steps Claus process—hydrotransformation—Super/Euroclaus—condensate separation—tail-gas burning; the sulfur recovery rate of the catalytic oxidation step is $\leq 85\%$. The tail-gas of the oxidation processes has an unacceptable sulfur content (total sulfur $\geq 960$ mg/m³, 1996 standard PRC).

The inventor introduced a process and a catalyst for selectively oxidizing low-$H_2S$-concentration-containing acid gas ($H_2S \leq 3.0\%$) in patent CN200810157750. For all the embodiments, $H_2S$ is $\leq 2\%$ and an adiabatic reactor is adopted, at the outlet of which $H_2S$ and $SO_2$ exist in the same time. $H_2S$: 20-60 mg/m³, SO2: 100-200 mg/m³. Although the total sulfur content is reduced, the $H_2S$ is far exceeding the emission standard ($H_2S \leq 5$ mg/m³). So re-treating is needed. Otherwise, when the $H_2S$ concentration is high, the activity of the $H_2S$ and the sulfur recovery is unsatisfying. The catalytically oxidizing catalysts have the following features in common: adopting adiabatic reactor, simple structure, high conversion rate, narrow applications, low concentration acid gas only (non-cycling, $H_2S \leq 3\%$), the sulfur recovery rate $\not> 90\%$; furthermore, the catalyst selectivity is inefficient and the tail-gas at the outlet may also contains $H_2S$ and $SO_2$ in the same time, which need to be re-treated. Generally, the tail-gas is able to be treated with thermal incineration and catalytic incineration. The thermal incineration is to add flue gas in the tail-gas of the thermal incinerator to convert the $H_2S$ to low-toxic $SO_2$ under high temperature of 700-800° C. with little sulfur recovery effects. The catalytic incineration (not applied in PRC) is to adopt the tail-gas burning catalyst to convert the $H_2S$ under the temperature of 300-400° C. The sulfur recovery rate is $\leq 30\%$. Large amount of $H_2S$-containing gas is emitted to the atmosphere, which pollute the environment and waste the sulfur resource. In PRC, the thermal incineration is widely used, which has large flue gas consumption. According to the data of a sulfur recovery device which adopts reduction and absorption method and with a capability of 80000 tons of sulfur/year, the flue gas consumption is amount to 2200 tons and over RMB100 million. Currently, the requirement for environment protection is imperative, the total sulfur ($SO_2$) emission target is down from 960 mg/m³ to 400 mg/m³ in the *Emission standard of air pollutants* issued in 2014 (PRC). So the need for a new sulfur recovery technology which is able to replace the Claus process is imperative. The key is to develop a selectively oxidizing catalyst with high sulfur recovery rate and a tail-gas burning catalyst with high conversion rate and high sulfur recovery rate, which is able to save energy, cut the emission, clean the environment, transfer the pollutants to the resource to the maximum extend, high profit yield and promote a healthy recycle in environment protection field.

In the oxidation reaction of $H_2S$, two different reactions exists:

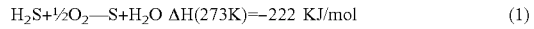

$$H_2S + \tfrac{1}{2}O_2 \longrightarrow S + H_2O \quad \Delta H(273K) = -222 \text{ KJ/mol} \qquad (1)$$

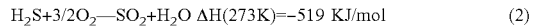

$$H_2S + 3/2O_2 \longrightarrow SO_2 + H_2O \quad \Delta H(273K) = -519 \text{ KJ/mol} \qquad (2)$$

The following conclusion is able to be drawn: the oxidation reaction of the $H_2S$ is strong exothermic reaction; under adiabatic condition, the reaction (1) has a temperature rise of 60° C. while 1% $H_2S$ oxidizing to element sulfur. Low temperature is favorable for the oxidation reaction. Without the catalyst, when the temperature reach 260° C. reaction (2) started. The reaction (2) is unfavorable reaction which should be avoided. So, the research hot topic is how to promote reaction (1), suppress reaction (2) develop catalyst with high activity and selectivity and find out suitable process.

SUMMARY OF THE PRESENT INVENTION

An object of the present invention is to provide a catalyst for selectively catalytically oxidizing hydrogen sulfide, which has high selectivity and high sulfur recovery rate.

Another object of the present invention is to provide a catalyst for burning tail-gas and provide a process for deeply catalytically oxidizing hydrogen sulfide to element sulfur, which is easy to operate and control.

The catalyst for selectively catalytically oxidizing Hydrogen sulfide, comprising components of a mass percent of: 10-34% of iron trioxide, 60-84% of anatase titanium dioxide and a balance which are auxiliary agents.

The catalyst for burning tail-gas, comprising components of a mass percent of: 48-78% of iron trioxide, 18-48% of anatase titanium dioxide and a balance which are auxiliary agents.

The catalyst for burning tail-gas, further comprises a mass percent of 0.4-0.8% of vanadium pentoxide.

The process for deeply catalytically oxidizing Hydrogen sulfide to element sulfur, wherein an isothermal reactor and adiabatic reactor are connected in series, which are filled with a catalyst for selectively catalytically oxidizing hydrogen sulfide and a catalyst for burning tail-gas respectively for reaction; wherein:

in the isothermal reactor the catalyst for selectively catalytically oxidizing Hydrogen sulfide is used under the following conditions:
temperature 150-300° C.,
space velocity 300-2000/h, 300-1000/h is preferred;
$O_2/H_2S$ mole ratio 0.5-1.5, 0.5-1.0 is preferred;

in the adiabatic reactor, the catalyst for burning tail-gas is used under the following conditions:
temperature 180-350° C.,
space velocity 1000-2000/h,
$O_2/H_2S$ mole ratio 1.0-3.0, 1.5-2.0 is preferred.

In the process, air is injected in a gas mixture at an entrance of the isothermal reactor according to the $O_2/H_2S$ mole ratio required by the catalyst for selective oxidation and the gas mixture passes through a source gas; a sulfur recovery rate of an isothermal reaction is ≥95%; air is injected at an entrance of the adiabatic reactor according to the $O_2/H_2S$ mole ratio required by the catalyst for burning tail-gas; in an adiabatic reaction a sulfur recovery rate is ≥90%, a conversion rate is ≥99%; in the vented-gas, $SO_2$ is ≤400 mg/m$^3$, $H_2S$ is ≤5 mg/m$^3$.

The auxiliary agents in the present invention are regular auxiliary agents, such as water glass, aluminum sol, silica sol, dilute nitric acid, sesbania powder, carboxymethyl cellulose and etc. The raw material is able to be get from the market, which contains 85% of the ferric oxide, industrial-grade meta-titanic acid (80% is titanium dioxide), 2% of dilute nitric acid aqueous solution.

The catalyst for selectively catalytically oxidizing hydrogen sulfide and the catalyst for burning tail-gas are processed according to the following steps:

Take the iron oxide (if the catalyst for burning tail-gas contains vanadium pentoxide, ammonium metavanadate of the same measurement as vanadium pentoxide is added at the same time); add dilute nitric acid aqueous solution (volume is 12-15% of the mass of iron oxide); blend for 30 minutes; then add meta-titanic acid, add aluminum sol and silica sol at the same time (volume is 10% of the total mass of iron oxide and meta-titanic acid); mix the solution with the sesbania powder (the mass of the sesbania powder is measured as 1% of the total amount of iron oxide and meta-titanic acid) and knead in the kneader for 40 minutes; then squeeze out a column of semi-finished product of 4 mm in diameter by using a screw extruder; place the semi-finished product in an environment with a temperature of 25° C. for 24-hour natural drying; then place the semi-finished product in the oven to dry for 2 hours under 150° C.; finally place the dried semi-finished product in the muffle and roast for 2 hours under 450° C. to get the test sample.

The benefits of the present invention are as follow:

In the process of catalytically oxidizing hydrogen sulfide to element sulfur, the adoption of the selective oxidation catalyst of the present invention significantly improves the selectivity of the catalyst and get high sulfur recovery rate which is ≥95%. The total sulfur content in the vented-gas is reduced significantly and the vented-gas deep purification burden is eased. The tail-gas burning catalyst is set after the selective oxidation catalyst, which further recovers the sulfur and the sulfur recovery rate is ≥90%, the residue of the hydrogen sulfide (≤10%) is completely converted to low-toxic sulfur dioxide. The high energy-consumption tail-gas burner is no longer needed, which cut the energy consumption and operation cost significantly. The method is simple and easy to control and operate. The present invention adopts a combination method of two different catalysts in the isothermal reactor and adiabatic reactor respectively, which extremely extends the $H_2S$ concentration range of the acid gas treatment. Self-heat balance is achieved within the system. The operation cost is less then 10% of the Claus process and the investment cost is 20% of the Claus process with the similar dealing capability. The present invention is able to replace the conventional Claus process and achieve the goal in one step. Realize the direct emission of the vented-gas without the burner while ensure a high sulfur recovery rate. The present invention fulfills the requirement of *Emission standard of air pollutants* issued in 2014 (PRC) and greatly benefits the environment and economy.

BRIEF DESCRIPTION OF THE DRAWINGS

FIG. 1 is a flow chart of a method of the present invention
Element number: 1. air filter; 2. air compressor; 3. pressure regulator; 4-1. first water-vapor separator; 4-2. second water-vapor separator; 5. air flow meter; 6. acid gas storage tank; 7. acid gas filter; 8. entrance stop valve; 9. acid gas flow meter; 10. acid gas heat exchanger; 11. gas mixing valve; 12. mixing heat exchanger; 13. isothermal reactor; 14. adiabatic reactor; 15-1. first collector; 15-2. second collector; 16. modified activated carbon filter tank; 17. heat conduction oil tank; 18. heat conduction cycling pump.

DETAILED DESCRIPTION OF THE PREFERRED EMBODIMENT

Referring to the drawings, according to a preferred embodiment of the present invention is illustrated, wherein The following instruments and condition are adopted for the catalyst activity evaluation in the embodiments.

CHT-02 small catalyst activity evaluation device (Beijing Wekindu Technology Co., Ltd);

TY-2000 integrated trace sulfur analyzer (Automation research branch of Southwest research & design institute of chemical industry);

3420A—gas chromatography analyzer (Beijing Maihak analytical instrument Co. Ltd.).

Note: Due to the $H_2S$ concentration of the acid gas of the source gas and the tail-gas of the reactor (≤100 mg/m$^3$) differs greatly, different analysis methods are adopted. So, the thermal conductivity detector of the gas chromatography is adopted for the source gas; the flame photometric detector is adopted for the analysis of the tail-gas. Another gas line of the gas chromatography adopts 4A molecular sieves as the support for analysis of the oxygen content in the acid gas.

Embodiment 1-3

In the embodiment 1-3, the isothermal reactor adopts catalyst A, B, C for selectively catalytically oxidizing hydrogen sulfide respectively. The evaluation condition parameter of the catalyst activity is listed in chart 1. The activity evaluation data and catalyst composition is listed in chart 2.

Contrast 1

In the contrast 1, the isothermal reactor adopts conventional catalyst D. The evaluation condition parameter of the catalyst activity is listed in chart 1. The activity evaluation data and catalyst composition is listed in chart 2.

CHART 1

Evaluation condition of the activity of the selective oxidation catalyst

| Volume of the catalyst | Granularity of the sample | Space velocity (based on the mixed acid gas) | Acid gas flow after air is injected in | Air flow |
|---|---|---|---|---|
| 8 ml | 20-40 mesh | 1500 $h^{-1}$ | 200 ml/min | 136 ml/min |

| Source acid gas $H_2S$ % | Acid gas after air is injected in $H_2S$ % | Residual oxygen content in tail-gas % | Oxygen content in air % | Water content of saturated water vapor (40° C.) |
|---|---|---|---|---|
| 11.75 | 8.45-8.65 | 0.14 | 21 | 5.8% |

CHART 2

Activity evaluation data of the selective oxidation catalyst

| | Composition | | | | | | | | | | |
|---|---|---|---|---|---|---|---|---|---|---|---|
| | A $Fe_2O_3$: 10% $TiO_2$: 84% | | | B $Fe_2O_3$: 24% $TiO_2$: 70% | | | C $Fe_2O_3$: 34% $TiO_2$: 60% | | | D $Fe_2O_3$: 5% $TiO_2$: 75% | | |
| | Tail-gas | | | | | | | | | | | |
| Temperature | $H_2S$ % | $SO_2$ % | S % | $H_2S$ % | $SO_2$ % | S % | $H_2S$ % | $SO_2$ % | S % | $H_2S$ % | $SO_2$ % | S % |
| 160° C. | 0.4165 | 0 | 95.1 | 0.4165 | 0 | 95.1 | 0.4080 | 0 | 95.2 | 0.6201 | 0.4001 | 87.9 |
|  | 0.3995 | 0 | 95.3 | 0.4080 | 0 | 95.2 | 0.3910 | 0 | 95.4 | 0.6513 | 0.4012 | 87.6 |
| 200° C. | 0 | 0.1700 | 98.0 | 0 | 0.2465 | 97.1 | 0 | 0.2310 | 97.2 | 0.2104 | 0.5691 | 91.9 |
|  | 0 | 0.2550 | 97.0 | 0 | 0.2550 | 97.0 | 0 | 0.2165 | 97.4 | 0.2204 | 0.4660 | 91.9 |
| 250° C. | 0.0010 | 0.3390 | 96.0 | 0.0070 | 0.2883 | 96.6 | 0.0109 | 0.2676 | 96.7 | 0.3728 | 0.6372 | 88.2 |
|  | 0.0009 | 0.3221 | 96.2 | 0.0080 | 0.3137 | 96.3 | 0.0110 | 0.2760 | 96.6 | 0.3120 | 0.4956 | 90.4 |
| 300° C. | 0.0015 | 0.3895 | 95.4 | 0.0091 | 0.3734 | 95.5 | 0.0254 | 0.3486 | 95.6 | 0.2023 | 0.6627 | 89.8 |
|  | 0.0014 | 0.3726 | 95.6 | 0.0089 | 0.3561 | 95.6 | 0.0161 | 0.3494 | 95.7 | 0.2013 | 0.6042 | 90.5 |

Embodiment 4-7

In the embodiment 4-7, the adiabatic reactor adopts tail-gas burning catalyst E, F, G, H. The evaluation condition parameter of the catalyst activity is listed in chart 3. The activity evaluation data and catalyst composition is listed in chart 4.

CHART 3

Evaluation condition of the activity of the tail-gas burning catalyst

| Volume of the catalyst | Granularity of the sample | Space velocity (based on the mixed acid gas) | Acid gas flow after air is injected in | Air flow |
|---|---|---|---|---|
| 8 ml | 20-40 mesh | 1500 $h^{-1}$ | 200 ml/min | 136 ml/min |

| Source acid gas $H_2S$ % | Acid gas after air is injected in $H_2S$ % | Residual oxygen content in tail-gas % | Oxygen content in air % | Water content of saturated water vapor (40° C.) |
|---|---|---|---|---|
| 5.20-5.34 | 3.15-3.25 | 0.52 | 20 | 5.8% |

CHART 4

Activity evaluation data of the tail-gas burning catalyst

| | Composition | | | | | | | | | | | |
|---|---|---|---|---|---|---|---|---|---|---|---|---|
| | E $Fe_2O_3$: 48% $TiO_2$: 48% $V_2O_5$: 0.4% | | | F $Fe_2O_3$: 48% $TiO_2$: 48% $V2O_5$: 0.8% | | | G $Fe_2O_3$: 60% $TiO_2$: 26% | | | H $Fe_2O_3$: 78% $TiO_2$: 18% | | |
| | Tail-gas | | | | | | | | | | | |
| Temperature | $H_2S$ % | $SO_2$ % | S % | $H_2S$ % | $SO_2$ % | S % | $H_2S$ % | $SO_2$ % | S % | $H_2S$ % | $SO_2$ % | S % |
| 180° C. | 0 | 0.2526 | 92.1 | 0. | 0.2231 | 93.0 | 0 | 0.2353 | 94.1 | 0 | 0.1032 | 96.7 |
| | 0 | 0.2401 | 92.5 | 0. | 0.2064 | 93.5 | 0 | 0.2754 | 94.4 | 0 | 01008 | 96.8 |
| 250° C. | 0 | 0.1504 | 95.3 | 0 | 0.1485 | 95.3 | 0 | 0.2433 | 92.3 | 0 | 0.1876 | 94.1 |
| | 0 | 0.1440 | 95.5 | 0 | 0.1523 | 95.2 | 0 | 0.2305 | 92.7 | 0. | 0.1794 | 94.3 |
| 300° C. | 0.01 | 0.1823 | 93.7 | 0.0094 | 0.1586 | 94.7 | 0.0016 | 0.1978 | 93.7 | 0. | 0.2643 | 91.7 |
| | 800.0233 | 0.1704 | 93.9 | 0.0078 | 0.1608 | 94.7 | 0.0008 | 0.2105 | 93.3 | 0 | 0.2712 | 91.5 |
| 350° C. | 0.0124 | 0.2311 | 92.3 | 0.0041 | 0.2853 | 90.9 | 0.0122 | 0.3023 | 90.1 | 0.0014 | 0.3132 | 90.1 |
| | 0.0145 | 0.2115 | 92.9 | 0.0068 | 0.2794 | 91.0 | 0.0136 | 0.2984 | 90.2 | 0.0023 | 0.2983 | 90.6 |

Embodiment 8

The process for deeply catalytically oxidizing hydrogen sulfide to element sulfur of the present invention adopts an isothermal reactor and an adiabatic reactor connected in series, which are filled with the catalyst for selectively catalytically oxidizing hydrogen sulfide and the catalyst for burning tail-gas respectively for reaction.

As illustrated in FIG. 1, the air after being filtered by the air filter 1 passes through the air compressor 2, the pressure regulator 3, the first water-vapor separator 4-1, the air flow meter 5 and reaches the gas mixing valve 11; the acid gas from the acid gas storage tank 6 passes through the second water-vapor separator 4-2, the acid gas filter 7, the entrance stop valve 8, the acid gas flow meter 9, the acid gas heat exchanger 10 and reached the gas mixing valve 11 to blend with air. The mixed gas passed through the mixing heat exchanger 12, the isothermal reactor 13, the first collector 15, the adiabatic reactor 14; the second collector 15-2, and is emitted after being treated by the modified activated carbon filter tank 16; the heat conduction oil tank 17 is set between the mixing heat exchanger 12 and the isothermal reactor 13; the heat conduction cycling pump 18 recycle and utilize the heat. The acid gas enters the isothermal reactor after being filled with air; the isothermal reactor adopts the catalyst A for selectively catalytically oxidizing hydrogen sulfide; the method parameters are listed in Chart 1; the space velocity is 1500/h; the reaction temperature is 200° C.; the tail-gas composition and sulfur recovery rate are listed in Chart 2; the tail gas enters the adiabatic reactor after being filled with air; the adiabatic reactor adopts the catalyst E for burning tail-gas; the space velocity is 1000/h; $O_2/H_2S$ mole ratio is 1.5; the reaction temperature is 250° C.; the sulfur recovery rate of the adiabatic reaction is 95.3%; the conversion rate is 99.5%; in the vented tail-gas, $SO_2$ is 0.1504 mg/m³, $H_2S$ is 0.

Embodiment 9

The process for deeply catalytically oxidizing hydrogen sulfide to element sulfur of the present invention adopts an isothermal reactor and an adiabatic reactor connected in series, which are filled with the catalyst for selectively catalytically oxidizing hydrogen sulfide and the catalyst for burning tail-gas respectively for reaction. The method is explained in the embodiment 8. The acid gas enters the isothermal reactor after being filled with air; the isothermal reactor adopts the catalyst B for selectively catalytically oxidizing hydrogen sulfide; the method parameters are listed in the Chart 1; the space velocity is 1500/h; the reaction temperature is 250° C.; the composition of the tail-gas and the sulfur recovery rate are listed in the Chart 2; the tail-gas enters the adiabatic rector after being filled with air; the adiabatic reactor adopts the catalyst F for burning tail-gas; the space velocity is 2000/h; the $O_2/H_2S$ mole ratio is 2.0; the reaction temperature is 300° C.; the sulfur recovery rate of the adiabatic reaction is 94.7%; the conversion rate is 99.8%; in the vented tail-gas, $SO_2$ is 0.1608 mg/m³, $H_2S$ is 0.0094 mg/m³.

What is claimed is:

1. A catalyst for selectively catalytically oxidizing hydrogen sulfide, comprising components of a mass percent of: 13-34% of iron trioxide, 60-72% of anatase titanium dioxide and a balance which are auxiliary agents.

2. A catalyst for burning tail-gas, comprising components of a mass percent of: 48-78% of iron trioxide, 18-48% of anatase titanium dioxide and a balance which are auxiliary agents.

3. The catalyst for burning tail-gas, as recited in claim 2, further comprising a mass percent of 0.4-0.8% of vanadium pentoxide.

4. A method for deeply catalytically oxidizing hydrogen sulfide to element sulfur comprises the following steps:
   adopting an isothermal reactor and an adiabatic reactor which are connected in series; and
   filling the isothermal reactor and the adiabatic reactor with a catalyst for selectively catalytically oxidizing the hydrogen sulfide and a catalyst for burning tail-gas respectively for reaction, wherein
   the catalyst for selectively catalytically oxidizing the hydrogen sulfide comprises components of a mass percent of: 10-34% of iron trioxide, 60-84% of anatase titanium dioxide and a balance which are auxiliary agents; and
   the catalyst for burning the tail-gas comprises components of a mass percent of: 48-78% of iron trioxide, 18-48% of anatase titanium dioxide and a balance which are auxiliary agents.

5. The method for deeply catalytically oxidizing the hydrogen sulfide to the element sulfur, as recited in claim 4, comprising the catalyst for burning the tail-gas with a mass percent of 0.4-0.8% of vanadium pentoxide.

6. The method for deeply catalytically oxidizing the hydrogen sulfide to the element sulfur, as recited in claim 5, injecting air into a gas mixture at an entrance of the isothermal reactor according to a $O_2/H_2S$ mole ratio required by the catalyst for selective oxidation and the gas mixture passes through a source gas; a sulfur recovery rate of an isothermal reaction is ≥95%; injecting air at an entrance of the adiabatic reactor according to a $O_2/H_2S$ mole ratio required by the catalyst for burning tail-gas; in an adiabatic reaction a sulfur recovery rate is ≥90%, a conversion rate is ≥99%; in vented tail-gas, $SO_2$ is ≤400 mg/m$^3$, $H_2S$ is ≤5 mg/m$^3$.

7. The method for deeply catalytically oxidizing the hydrogen sulfide to the element sulfphur, as recited in claim 4, using the catalyst for selectively catalytically oxidizing the hydrogen sulfide under following conditions: a temperature of 150-300° C., a space velocity of 300-2000/h, and an $O_2/H_2S$ mole ratio of 0.5-1.5.

8. The method for deeply catalytically oxidizing the hydrogen sulfide to the element sulfur, as recited in claim 7, wherein the space velocity is between 300-1000/h, the $O_2/H_2S$ mole ratio is between 0.5-1.0.

9. The method for deeply catalytically oxidizing the hydrogen sulfide to the element sulfur, as recited in claim 8, injecting air into a gas mixture at an entrance of the isothermal reactor according to the $O_2/H_2S$ mole ratio required by the catalyst for selective oxidation and the gas mixture passes through a source gas; a sulfur recovery rate of an isothermal reaction is ≥95%; injecting air at an entrance of the adiabatic reactor according to a $O_2/H_2S$ mole ratio required by the catalyst for burning tail-gas; in an adiabatic reaction a sulfur recovery rate is ≥90%, a conversion rate is ≥99%; in vented tail-gas, $SO_2$ is ≤400 mg/m$^3$, $H_2S$ is ≤5 mg/m$^3$.

10. The method for deeply catalytically oxidizing the hydrogen sulfide to the element sulfur, as recited in claim 7, injecting air into a gas mixture at an entrance of the isothermal reactor according to the $O_2/H_2S$ mole ratio required by the catalyst for selective oxidation and the gas mixture passes through a source gas; a sulfur recovery rate of an isothermal reaction is ≥95%; injecting air at an entrance of the adiabatic reactor according to a $O_2/H_2S$ mole ratio required by the catalyst for burning tail-gas; in an adiabatic reaction a sulfur recovery rate is ≥90%, a conversion rate is ≥99%; in vented tail-gas, $SO_2$ is ≤400 mg/m$^3$, $H_2S$ is ≤5 mg/m$^3$.

11. The method for deeply catalytically oxidizing the hydrogen sulfide to the element sulfphur, as recited in claim 4, using the catalyst for burning the tail-gas under following conditions: a temperature of 180-350° C., a space velocity of 1000-2000/h, an $O_2/H_2S$ mole ratio of 1.0-3.0.

12. The method for deeply catalytically oxidizing the hydrogen sulfide to the element sulfphur, as recited in claim 11, wherein the $O_2/H_2S$ mole ratio is between 1.5-2.0.

13. The method for deeply catalytically oxidizing the hydrogen sulfide to the element sulfur, as recited in claim 12, injecting air into a gas mixture at an entrance of the isothermal reactor according to a $O_2/H_2S$ mole ratio required by the catalyst for selective oxidation and the gas mixture passes through a source gas; a sulfur recovery rate of an isothermal reaction is ≥95%; injecting air at an entrance of the adiabatic reactor according to the $O_2/H_2S$ mole ratio required by the catalyst for burning tail-gas; in an adiabatic reaction a sulfur recovery rate is ≥90%, a conversion rate is ≥99%; in vented tail-gas, $SO_2$ is ≤400 mg/m$^3$, $H_2S$ is ≤5 mg/m$^3$.

14. The method for deeply catalytically oxidizing the hydrogen sulfide to the element sulfur, as recited in claim 11, injecting air into a gas mixture at an entrance of the isothermal reactor according to a $O_2/H_2S$ mole ratio required by the catalyst for selective oxidation and the gas mixture passes through a source gas; a sulfur recovery rate of an isothermal reaction is ≥95%; injecting air at an entrance of the adiabatic reactor according to the $O_2/H_2S$ mole ratio required by the catalyst for burning tail-gas; in an adiabatic reaction a sulfur recovery rate is ≥90%, a conversion rate is ≥99%; in vented tail-gas, $SO_2$ is ≤400 mg/m$^3$, $H_2S$ is ≤5 mg/m$^3$.

15. The method for deeply catalytically oxidizing the hydrogen sulfide to the element sulfur, as recited in claim 4, injecting air into a gas mixture at an entrance of the isothermal reactor according to a $O_2/H_2S$ mole ratio required by the catalyst for selective oxidation and the gas mixture passes through a source gas; a sulfur recovery rate of an isothermal reaction is ≥95%; injecting air at an entrance of the adiabatic reactor according to a $O_2/H_2S$ mole ratio required by the catalyst for burning tail-gas; in an adiabatic reaction a sulfur recovery rate is ≥90%, a conversion rate is ≥99%; in vented tail-gas, $SO_2$ is ≤400 mg/m$^3$, $H_2S$ is ≤5 mg/m$^3$.

\* \* \* \* \*